(12) United States Patent
Burdiak et al.

(10) Patent No.: US 10,125,764 B2
(45) Date of Patent: Nov. 13, 2018

(54) VANE PUMP WITH ADJUSTABLE DELIVERY VOLUME

(71) Applicant: Robert Bosch Automotive Steering GmbH, Schwäbisch Gmünd (DE)

(72) Inventors: Johannes Burdiak, Schwäbisch Gmünd (DE); Richard Vogt, Schwäbisch Gmünd (DE); Uwe Zellner, Iggingen (DE)

(73) Assignee: Robert Bosch Automotive Steering GmbH, Schwäbisch Gmünd (DE)

( * ) Notice: Subject to any disclaimer, the term of this patent is extended or adjusted under 35 U.S.C. 154(b) by 208 days.

(21) Appl. No.: 15/305,973

(22) PCT Filed: Feb. 17, 2015

(86) PCT No.: PCT/EP2015/053317
§ 371 (c)(1),
(2) Date: Oct. 21, 2016

(87) PCT Pub. No.: WO2015/161939
PCT Pub. Date: Oct. 29, 2015

(65) Prior Publication Data
US 2017/0045047 A1    Feb. 16, 2017

(30) Foreign Application Priority Data

Apr. 22, 2014  (DE) .................. 10 2014 105 613

(51) Int. Cl.
*F04C 14/22*    (2006.01)
*F01C 21/10*    (2006.01)
(Continued)

(52) U.S. Cl.
CPC .......... *F04C 14/223* (2013.01); *F01C 21/108* (2013.01); *F04C 2/344* (2013.01);
(Continued)

(58) Field of Classification Search
CPC ............................ F04C 14/223; F04C 14/226
See application file for complete search history.

(56) References Cited

U.S. PATENT DOCUMENTS

| 3,012,511 | A |   | 12/1961 | Adams |   |
|---|---|---|---|---|---|
| 3,456,593 | A | * | 7/1969 | Rosaen | F04C 14/223 417/220 |
| 3,650,642 | A | * | 3/1972 | Cygnor | F04C 14/223 418/26 |

FOREIGN PATENT DOCUMENTS

| DE | 102004060082 | 6/2006 |
|---|---|---|
| DE | 102006060433 | 6/2008 |
| DE | 102009046516 | 5/2011 |

OTHER PUBLICATIONS

International Search Report for Application No. PCT/EP2015/053317 dated May 11, 2015 (English Translation, 3 pages).

* cited by examiner

*Primary Examiner* — Mary A Davis
(74) *Attorney, Agent, or Firm* — Michael Best & Friedrich LLP

(57) ABSTRACT

The invention proposes a vane pump (VP) with adjustable delivery volume, which vane pump has a pump housing (G), a cam ring (KR) arranged therein, and a rotor (R) which is rotatably movably mounted therein. The vane pump (VP) has a regulating device (RV) through which the delivered pressure medium (DM) flows and which has two outlets (A1, A2) which are each connected to one of two pressure chambers (DK1, DK2) in order to charge these with regulable proportions of the pressure medium (DM), wherein, to change the eccentricity of the cam ring (KR) relative to the rotor (R), the two pressure chambers (DK1, DK2) act on the outer surface of the cam ring (KR). The vane pump (VP) has two criss-crossing control ducts (STK*, STK#) which connect in each case one of the outlets (A1, A2) to one of the (Continued)

two pressure chambers (DK1, DK2) in order to charge these with the regulable proportions of the pressure medium (DM). The criss-crossing control ducts (STK*, STK#) are preferably arranged in a cover (D') of the pump housing such that the control ducts (STK*, STK#) are in a criss-crossing arrangement without coming into contact with one another. By means of this design, the vane pump (VP) can be easily reconfigured for a change in rotational direction of the rotor.

11 Claims, 4 Drawing Sheets

(51) Int. Cl.
  *F04C 14/04* (2006.01)
  *F04C 2/344* (2006.01)
  *B62D 5/14* (2006.01)
(52) U.S. Cl.
  CPC ............ *F04C 14/04* (2013.01); *F04C 14/226* (2013.01); *B62D 5/14* (2013.01); *F04C 2240/10* (2013.01); *F04C 2240/70* (2013.01)

VANE PUMP WITH ADJUSTABLE DELIVERY VOLUME

BACKGROUND OF THE INVENTION

The invention relates to a vane pump. In particular, the invention relates to a vane pump for use in a power steering system.

Usually, vane pumps with adjustable delivery volume, which are frequently also designated as adjustable pumps, are designed as follows: In essence, a cam ring or stroke contour ring and a rotatably movably mounted rotor are arranged in a pump housing. The rotor has radial slots, in which vanes are arranged such that they can be displaced radially and guided positively by the slots. During operation of the vane pump, the vanes thus slide along with their outer ends resting on the inner wall of the cam ring and, as a result, effect the delivery of a pressure medium (e.g. pressurized oil). As distinct from pumps with a constant delivery volume (constant delivery pumps), pumps with variable delivery volume are able to avoid the situation in which, in particular at high rotational speeds, overproduction of pressurized oil results, which, in the case of constant delivery pumps, must be partly compensated for by bypass circulation. Therefore, in constant delivery pumps in the higher rotational speed range, mechanically unusable energy is consumed by this bypass circulation, which is equivalent to an unnecessary loss of heat and energy. In order to control the delivery volume, in particular in order to reduce the delivery volume with increasing rotational speed, the eccentricity of the cam ring relative to the rotor is changed, in particular reduced. To this end, a conventional vane pump has a control device (e.g. control valve) with two outlets which, via control ducts, are able to supply a respective proportion of the delivered pressure medium to a left-hand and right-hand pressure chamber. The pressure chambers act from the left and the right on the outer surface of the cam ring and thus effect the desired change in the eccentricity of the cam ring relative to the rotor.

A vane pump of the type mentioned at the beginning is known, for example from the document DE 10 2004 060 082 A1 C1. By using FIGS. 1 to 3, the structure of such a conventional vane pump with adjustable delivery volume (adjustable pump for short) is illustrated.

FIGS. 1 and 3 show the structure of the known pump in cross section; FIG. 2 shows a three-dimensional illustration of the pump. The known adjustable pump VP has a pump housing G and a cam ring KR arranged therein (also called a stroke contour ring). A rotor R rotatably movably mounted therein is provided with a plurality of radial slots, in which vanes F are arranged such that they can be displaced radially and are positively guided and, during rotation, deliver a pressure medium DM from the suction side PSS to the pressure side PDS. To change the delivery volume, the position of the cam ring KR relative to the rotor R can be changed, so that the result is an adjustable eccentricity. For this purpose, the pump has two pressure chambers DK1 and DK2, which act from the left and right on the outer side of the cam ring KR, in which the pressure chambers are charged with a controllable proportion of the pressure medium DM. The control is achieved via a control device, which is usually designed as a control valve RV which has two outlets A1 and A2, in order to supply and discharge the proportion of the pressure medium via control ducts STK1 and STK2 to the pressure chambers in order that the different pressure in the chambers effects displacement of the cam ring KR relative to the rotor R, so that the desired eccentricity and therefore the desired geometric delivery volume is set.

SUMMARY OF THE INVENTION

With the given design, the vane pump is designed for a direction of rotation; in the present case, the rotor R rotates counterclockwise (rotating to the left). If it is wished to change the direction of rotation of the pump (rotating to the right, clockwise), then the pump housing in the region of the control device (control valve) RV would have to be redesigned. This would entail a very high outlay. In addition, another front plate with mirror-image control geometry would have to be used, and the outer ring which bounds the pressure chambers radially on the outside would have to be installed in the pump housing in a mirror-inverted manner. Usually, these complicated and costly measures are carried out, which results in the kit for a left-rotating pump differing from a kit for a right-rotating pump in numerous parts, including the pump housing.

It is an object of the invention to improve a vane pump of the type mentioned at the beginning such that it is achieved with an economical design which makes it possible to be able to change the direction of rotation of the rotor with little technical outlay.

Accordingly, a vane pump with adjustable delivery volume is proposed which is distinguished by the fact that the vane pump has two criss-crossing control ducts, which each connect one of the outlets of the control device (control valve) to one of the two pressure chambers in order to charge the latter with the controllable proportions of the pressure medium.

Thus, two criss-crossing connections (control ducts) between the outlets (control duct connections) of the control device and the pressure chambers are created, so that the control of the eccentricity is precisely reversed and the vane pump can thus be converted to an opposite direction of rotation without the outlay that is otherwise usual. The criss-crossing arrangement of the control ducts will also be designated as a "crossover design" below and in particular has the advantage that the pump can be converted even without changing the pump housing and only by replacing a few components for a change in the direction of rotation. If the criss-crossing control ducts are provided in the cover of the pump housing, it is substantially necessary for only the cover and the front plate to be replaced, and the rotor set (rotor with vanes) merely needs to be installed in a mirror-inverted manner.

The invention can be implemented as a kit or kit system, in which a cover with criss-crossing control ducts and a cover (other variant) with non-criss-crossing control ducts (running parallel to each other) are provided. Depending on the desired direction of rotation, the suitable cover is again installed during the fabrication of the pump. For the different directions of rotation, so to speak, all the components of the pump are identical apart from the front plate and the cover. As far as the two cover variants are concerned, these can be fabricated by using die-casting, which means that the same unfinished part (cast part) can be used. For the two variants, it is then necessary only for the machining of the unfinished part to be carried out differently in each case, i.e. in essence the bores for control ducts must be made either in a non-criss-crossing variant or in a criss-crossing variant ("crossover boring"). If the parts lists or components lists of the left-rotating variant are compared with the right-rotating variant, only two differing parts result: the cover and front plates are different in terms of the components; the rotor set, however, is identical and needs only to be installed in mirror-image fashion about the vertical. All the other pump parts of the two variants are the same.

The invention also discloses a kit for a vane pump with adjustable delivery volume, wherein the kit is distinguished by the fact that it has a first cover with two non-criss-crossing control ducts in order to each connect one of the control device outlets to one of the two pressure chambers in a non-criss-crossing manner, in order to charge the latter with the controllable proportions of the pressure medium, and that the kit for replacing the first cover has a second cover with two criss-crossing control ducts, in order to connect respectively one of the outlets to one of the two pressure chambers in a criss-crossing manner.

Furthermore, the invention also comprises a power steering system which is equipped with a vane pump which has such a "crossover design". The power steering system and the pump are preferably used in the utility vehicle sector.

Accordingly, it is advantageous if at least one of the two control ducts is arranged in the pump housing or in a cover of the housing, such that the control ducts cross without coming into contact with one another. Here, both control ducts can also be implemented in the material of the pump housing or cover, in the form of bores which do not touch one another but only cross. The control ducts are preferably implemented in the cover, which means that the pump housing itself does not have to be changed or adapted. In particular, the installation area for the control device and the design of the control device itself can remain unchanged for both variants (right-rotating or left-rotating pump).

As an alternative or in combination with the above embodiment, it is also possible for at least one of the two control ducts to be arranged (externally) on the pump housing or (externally) on a cover of the housing such that the control ducts cross without coming into contact with one another. In individual situations, it may be advantageous to implement the criss-crossing control ducts for the most part not in the material of the housing and/or cover but as external lines which are fixed to the housing and/or cover. This solution may possibly be the more economical solution.

In general, the vane pump should preferably be designed such that a first outlet of the two outlets is arranged closer to a first pressure chamber of the two pressure chambers than a second outlet of the two outlets, and that the two criss-crossing control ducts are arranged such that one of the two control ducts connects the first outlet to the second pressure chamber and the other of the control ducts connects the second outlet to the first pressure chamber. Preferably, the first outlet and the first pressure chamber are arranged on the pressure side of the vane pump, and the second outlet and the second pressure chamber are arranged on the suction side of the vane pump.

It is advantageous if the two criss-crossing control ducts are created by bores in the pump housing or in a cover of the housing, wherein un-needed bore openings are closed by closure elements, in particular plugs. As a result, criss-crossing control ducts can also be implemented in the material of the housing and/or cover with simple straight bores.

The cover of the housing preferably has a trailing vane geometry for a left-rotating or right-rotating rotor, which is formed with mirror symmetry relative to a trailing vane geometry for a right-rotating or left-rotating rotor respectively.

With respect to the front plate, the vane pump is preferably configured in such a way that the vane pump has a front plate with a control geometry for a left-rotating or right-rotating rotor, which is formed with mirror symmetry relative to a control geometry for a right-rotating or left-rotating rotor respectively.

BRIEF DESCRIPTION OF THE DRAWINGS

In the following text, the invention will be described in detail by using an exemplary embodiment and with reference to the appended drawings:

FIGS. 4 a) and 4b) show alternative covers. In the following text, the differences between the invention and the conventional structure will be described, reference also being made to FIGS. 4a and 4b, which reproduce the following illustrations:

DETAILED DESCRIPTION

Figure 1:
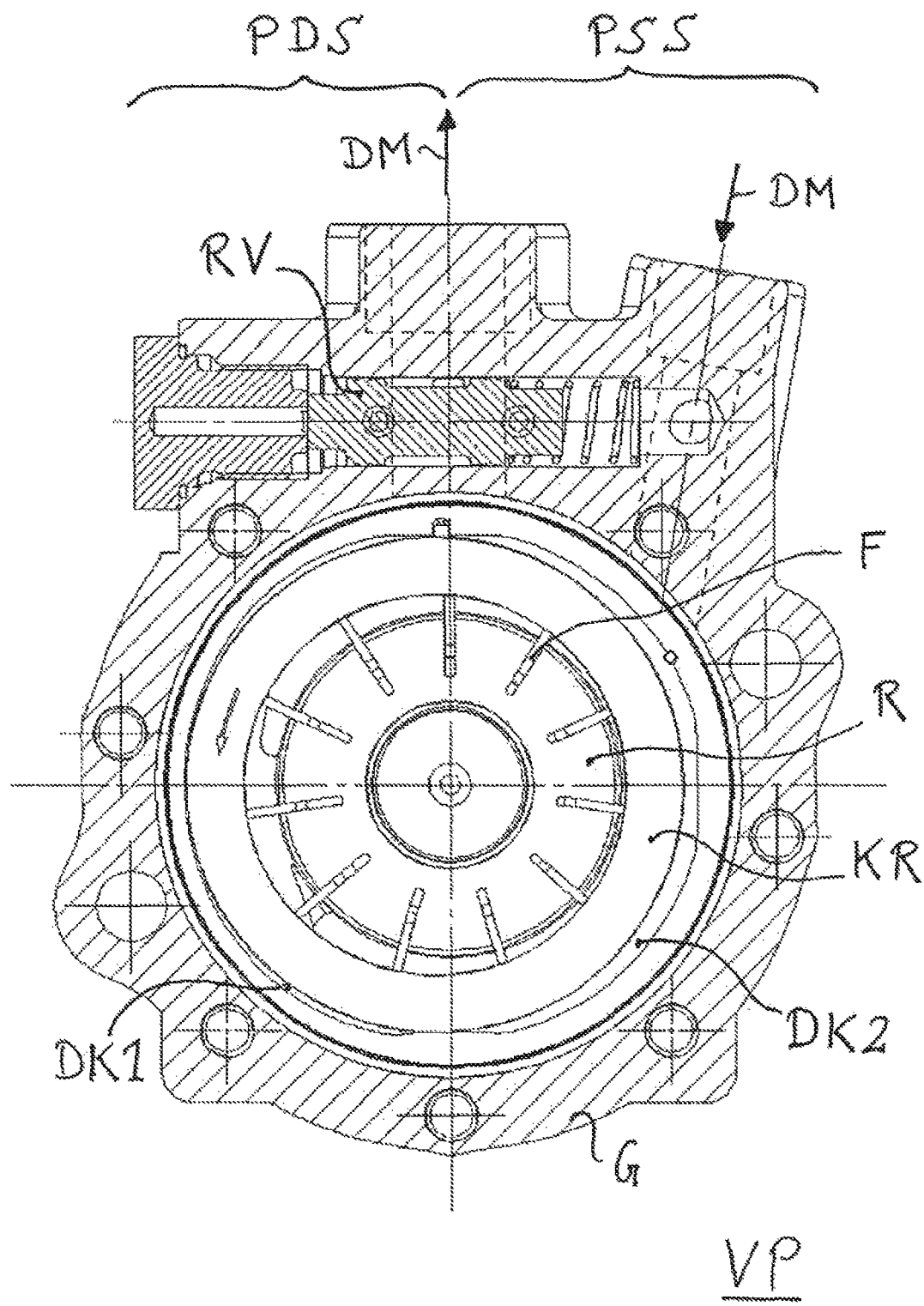
FIGS. 1 to 3 show the conventional structure of a vane pump VP, and can also be used for the invention since, in the vane pump according to the invention, most of the components remain unchanged and only a few design measures and reconfigurations have to be carried out in order to change the direction of rotation of the pump.
Figure 2:
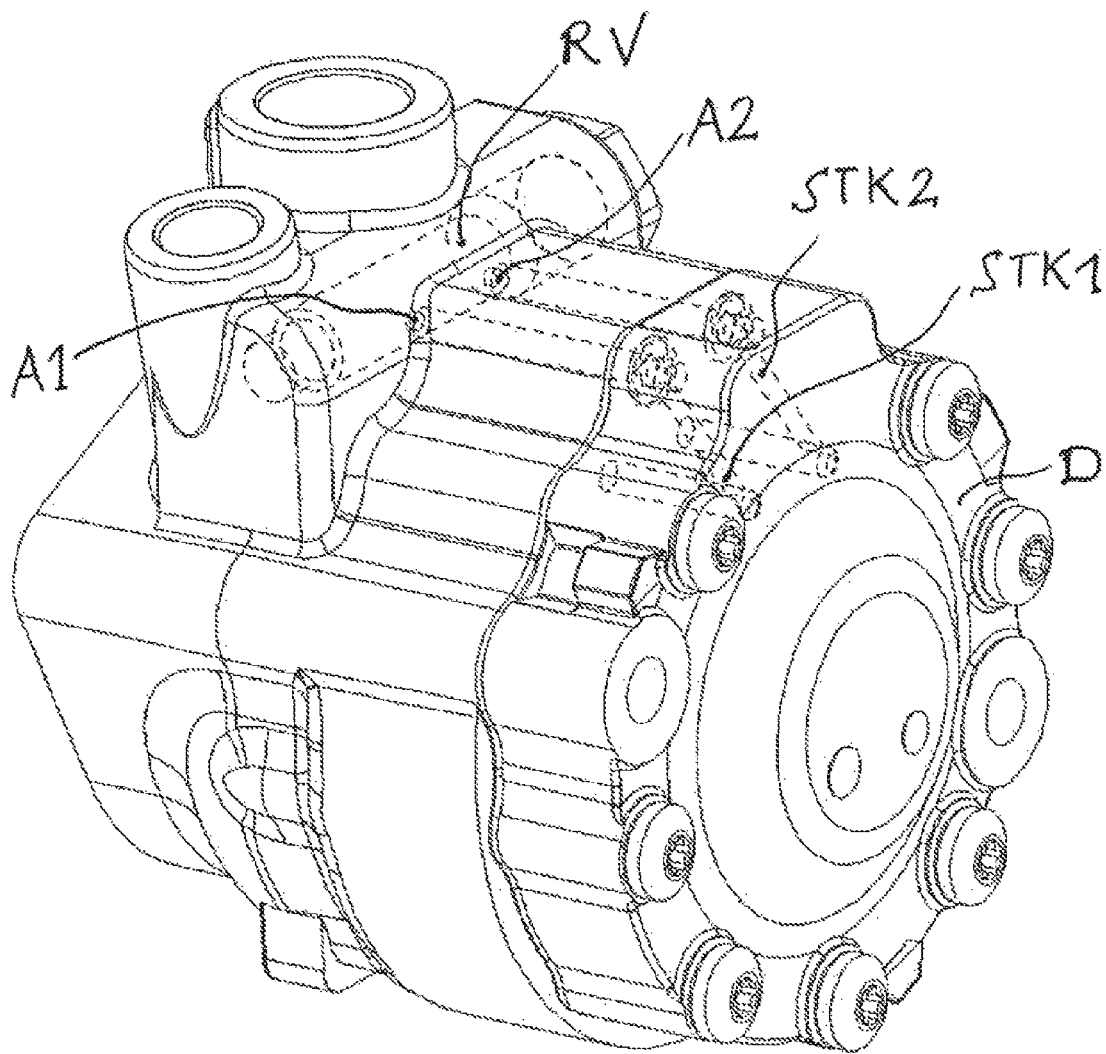
Figure 3:
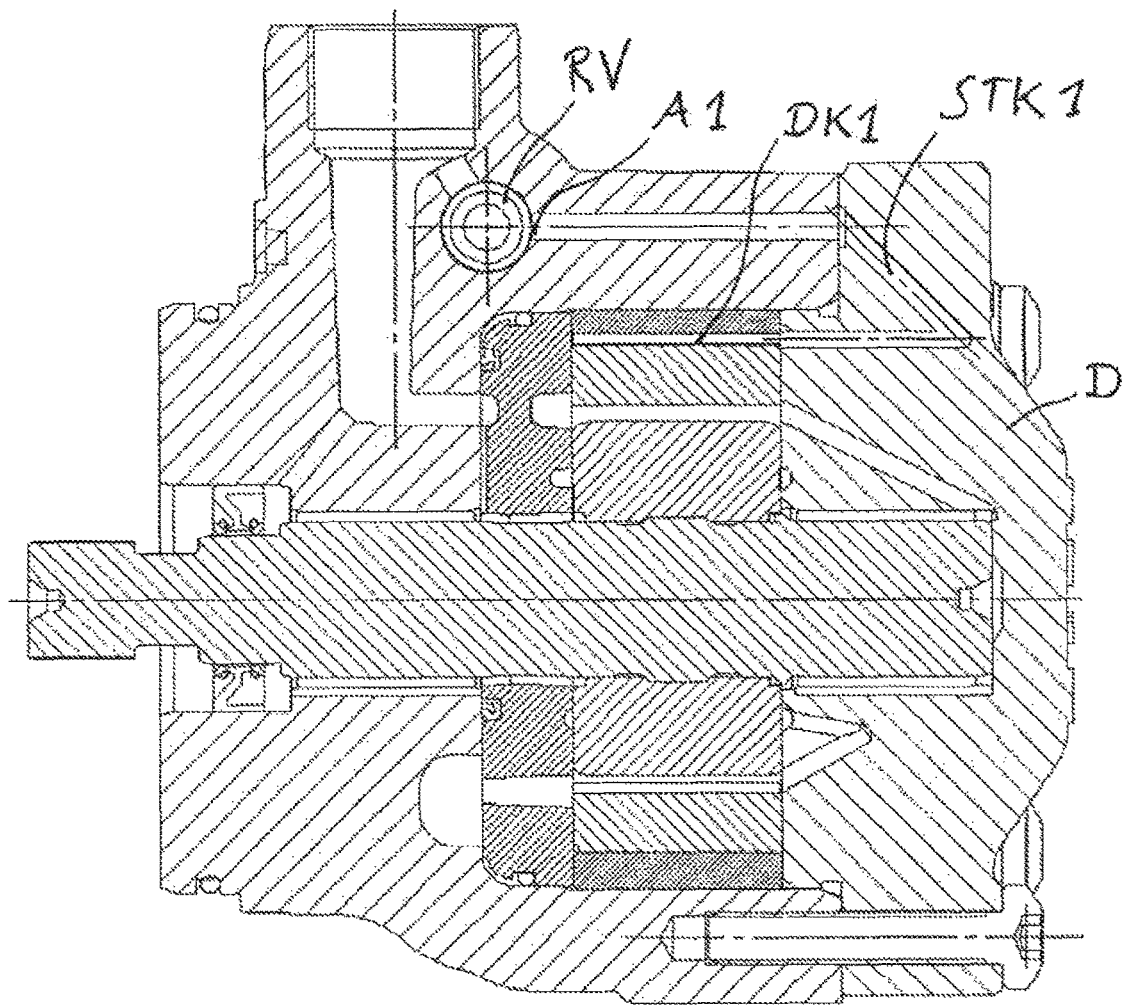

Starting from FIGS. 1 to 3, the vane pump VP according to the invention also has a pump housing G, in which a rotor R is arranged within a cam ring KR, which in turn can be displaced via pressure chambers DK1 and DK2 such that the eccentricity of the cam ring KR relative to the rotor R required for the desired delivery volume is set.

Figure 4A:
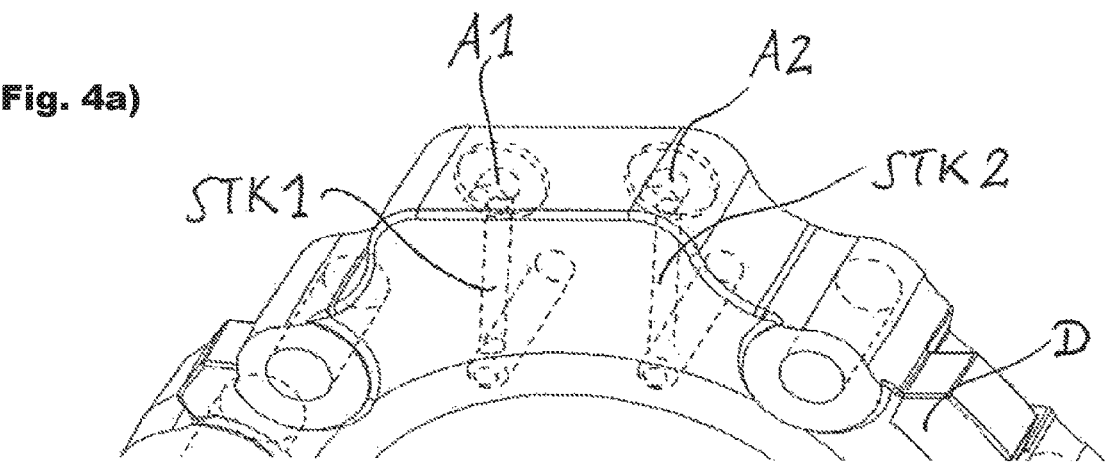
FIG. 4a) shows a first cover with straight control duct bores.
Figure 4B:
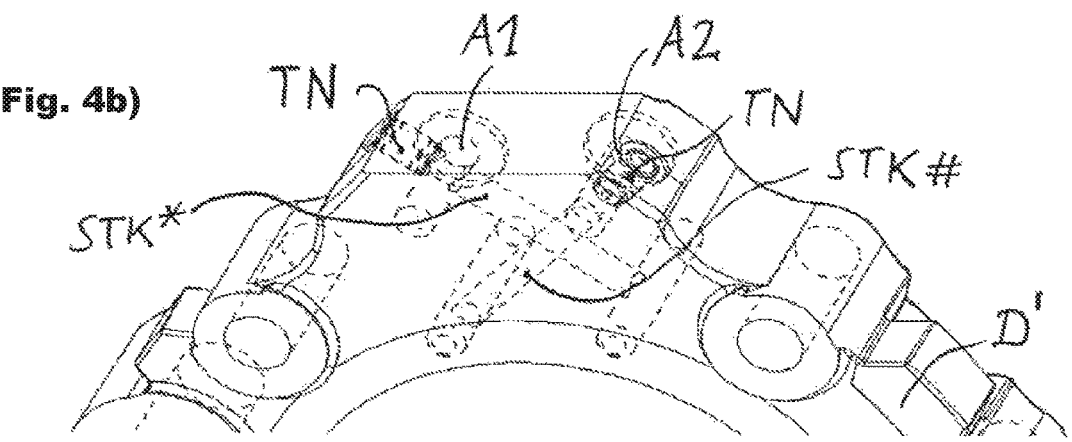
FIG. 4b) shows a second cover with criss-crossing control duct bores.

For a left-rotating configuration of the pump, the structure shown in FIGS. 1 to 3 is suitable. In conjunction with the kit according to the invention, the cover D shown in FIG. 4a, which has two control ducts STK1 and STK2 running in parallel, is now used, so that initially the pressure chambers are still connected as usual to the control device (valve RV in FIGS. 1-3). In order to reconfigure the pump to right-hand rotation, the cover D is replaced by a cover D', which is shown in FIG. 4b. This cover D' has two criss-crossing control ducts STK* and STK#, which are implemented by means of appropriate bores, un-needed openings being closed by plugs TN. The control ducts are therefore preferably implemented by bores which, although they cross, do not intersect.

As FIG. 4b shows when viewed together with FIGS. 1-3, the cover D' effects an interchange of the control ducts, so that the pump can then be set up for right-hand rotation. To this end, the cover D' merely has to have a mirrored trailing vane geometry. In addition, another front plate, which has a mirrored control geometry, must also be used. Otherwise, no measures have to be taken; in particular, the housing G does not have to be reconfigured; likewise nor does the control valve RV.

In the present example, the vane pump is designed with only one stroke and has two control ducts for this purpose. The pump can also be designed with multiple strokes (e.g. double-stroke) and have a corresponding number of control ducts.

The invention is supplied for all types of vane pump, but is particularly suitable as a steering pump for installation within a power steering system.

LIST OF DESIGNATIONS

VP Vane pump with adjustable cam ring (adjustable pump)
G Pump housing

R Rotor
F Vane
KR Cam ring (Stroke contour ring)
D Cover of the housing
PDS Pressure side (pump pressure side)
PSS Suction side (pump suction side)
DK1 First pressure chamber (adjustable pressure chamber)
DK2 Second pressure chamber (adjustable pressure chamber)
STK1 First control duct
STK2 Second control duct
RV Control device (control valve) through which a pressure medium flows
A1 First outlet to the respectively connected pressure chamber
A2 Second outlet to the respectively connected pressure chamber
STK*, STK# Criss-crossing control ducts

The invention claimed is:

1. A vane pump (VP) with adjustable delivery volume, which vane pump has a pump housing (G), a cam ring (KR) arranged therein, and a rotor (R) which is rotatably movably mounted therein and has radial slots, in which vanes (F) are arranged such that the vanes can be displaced radially and are positively guided, wherein, in order to deliver a pressure medium (DM) through the vane pump, the vanes slide along the cam ring with outer ends of the vanes resting on an inner wall of the cam ring (KR), and the vane pump has a control device (RV), through which pressure medium (DM) flows, and the control device has two outlets (A1, A2), which are each connected to a respective one of two pressure chambers (DK1, DK2), in order to charge the pressure chambers with controllable proportions of the pressure medium (DM), wherein, to change an eccentricity of the cam ring (KR) relative to the rotor (R), the two pressure chambers (DK1, DK2) act on an outer surface of the cam ring (KR),
characterized in that
the vane pump (VP) has two criss-crossing control ducts (STK*, STK#), which each connect one of the outlets (A1, A2) to a respective one of the two pressure chambers (DK1, DK2) in order to charge the pressure chambers with the controllable proportions of the pressure medium (DM).

2. The vane pump (VP) as claimed in claim 1, characterized in that at least one of the two control ducts (STK*, STK#) is arranged in the pump housing (G) or in a cover (D') of the pump housing, such that the control ducts (STK*, STK#) cross without coming into contact with one another.

3. The vane pump (VP) as claimed in claim 2, characterized in that a first outlet (A1) of the two outlets is arranged closer to a first pressure chamber (DK1) of the two pressure chambers than a second outlet (A2) of the two outlets, and in that the two criss-crossing control ducts (STK*, STK#) are arranged such that one (STK*) of the two control ducts connects the first outlet (A1) to the second pressure chamber (DK2), and the other (STK#) of the control ducts connects the second outlet (A2) to the first pressure chamber (DK1).

4. The vane pump (VP) as claimed in claim 3, characterized in that the first outlet (A1) and the first pressure chamber (DK1) are arranged on a pressure side (PDS) of the vane pump (VP), and in that the second outlet (A2) and the second pressure chamber (DK2) are arranged on a suction side (PDS) of the vane pump (VP).

5. The vane pump (VP) as claimed in claim 2, characterized in that the cover (D') of the pump housing has a trailing vane geometry for a left-rotating or right-rotating rotor, which is formed with mirror symmetry relative to a trailing vane geometry for a right-rotating or left-rotating rotor respectively.

6. The vane pump as claimed in claim 1, characterized in that at least one of the two control ducts is arranged on the pump housing (G) or on a cover (D') of the pump housing such that the control ducts cross without coming into contact with one another.

7. The vane pump (VP) as claimed in claim 1, characterized in that the two criss-crossing control ducts (STK*, STK#) are created by bores in the pump housing (G) or in a cover (D') of the pump housing, wherein un-needed bore openings are closed by closure elements.

8. The vane pump (VP) as claimed in claim 1, characterized in that the vane pump (VP) has a front plate with a control geometry for a left-rotating or right-rotating rotor, which is formed with mirror symmetry relative to a control geometry for a right-rotating or left-rotating rotor respectively.

9. A power steering system having a vane pump (VP) as claimed in claim 1.

10. The vane pump (VP) as claimed in claim 1, characterized in that the two criss-crossing control ducts (STK*, STK#) are created by bores in the pump housing (G) or in a cover (D') of the pump housing, wherein un-needed bore openings are closed by plugs (TN).

11. A kit for a vane pump (VP) with adjustable delivery volume, which vane pump has a pump housing (G), a cam ring (KR) arranged therein, and a rotor (R) which is rotatably movably mounted therein and has radial slots, in which vanes (F) are arranged such that the vanes can be displaced radially and are positively guided, wherein, in order to deliver a pressure medium (DM) through the vane pump, the vanes slide along the cam ring with outer ends of the vanes resting on the inner wall of the cam ring (KR), and the vane pump has a control device (RV), through which pressure medium (DM) flows, and the control device has two outlets (A1, A2), which are each connected to a respective one of two pressure chambers (DK1, DK2), in order to charge the pressure chambers with controllable proportions of the pressure medium (DM), wherein, to change an eccentricity of the cam ring (KR) relative to the rotor (R), the two pressure chambers (DK1, DK2) act on an outer surface of the cam ring (KR),
characterized in that
the kit for the pump housing (G) has a first cover (D) with two non-criss-crossing control ducts (STK1, STK2) in order to each connect one of the outlets (A1, A2) to a respective one of the two pressure chambers (DK1, DK2) in a non-criss-crossing manner, in order to charge the latter with the controllable proportions of the pressure medium (DM), and in that the kit for replacing the first cover (D) has a second cover (D') with two criss-crossing control ducts (STK*, STK#), in order to connect respectively one of the outlets (A1, A2) to one of the two pressure chambers (DK1, DK2) in a criss-crossing manner.

* * * * *